United States Patent
Spinelli et al.

(10) Patent No.: US 9,776,717 B2
(45) Date of Patent: Oct. 3, 2017

(54) AERIAL AGRICULTURAL MANAGEMENT SYSTEM

(71) Applicant: The Boeing Company, Chicago, IL (US)

(72) Inventors: Charles B. Spinelli, Mesa, AZ (US); John Lyle Vian, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/873,399

(22) Filed: Oct. 2, 2015

(65) Prior Publication Data

US 2017/0096222 A1    Apr. 6, 2017

(51) Int. Cl.
*B64C 27/08*    (2006.01)
*B64C 33/00*    (2006.01)
(Continued)

(52) U.S. Cl.
CPC ........... *B64C 39/024* (2013.01); *B64C 27/08* (2013.01); *B64C 33/00* (2013.01); *B64F 1/007* (2013.01);
(Continued)

(58) Field of Classification Search
CPC ....... B64C 39/024; B64C 33/00; B64C 27/08; B64C 2201/182; B64C 2201/024;
(Continued)

(56) References Cited

U.S. PATENT DOCUMENTS 8,060,270 B2    11/2011    Vian et al.
8,260,485 B1    9/2012    Meuth et al.
(Continued)

FOREIGN PATENT DOCUMENTS

CN    104583078 A    4/2015
DE    102008004054 A1    7/2009
(Continued)

OTHER PUBLICATIONS

Kesler et al., "Automated Postflight Troubleshooting Sensor Array," U.S. Appl. No. 12/701,033, filed Feb. 5, 2010, 54 pages.
(Continued)

*Primary Examiner* — Redhwan K Mawari
*Assistant Examiner* — Alan D Hutchinson
(74) *Attorney, Agent, or Firm* — Yee & Associates, P.C.

(57) ABSTRACT

An apparatus comprises a base vehicle, a takeoff and landing system, a rack system, a refueling system associated with the base vehicle, and a controller. The rack system comprises a group of racks with slots in which the slots receive unmanned aerial vehicles, provide refueling connections that facilitate refueling of the unmanned aerial vehicles located in the slots, and provide data connections that facilitate data transmission with the unmanned aerial vehicles located in the slots. The refueling system refuels an unmanned aerial vehicle located in a slot using a refueling connection in the refueling connections. The controller communicates with the unmanned aerial vehicle using a data connection and control the refueling of the unmanned aerial vehicles by the refueling system while the unmanned aerial vehicle is in the slot, enabling exchanging data with the unmanned aerial vehicle and the refueling of the unmanned aerial vehicle simultaneously.

24 Claims, 13 Drawing Sheets

(51) Int. Cl.
*B64C 39/02* (2006.01)
*B64F 1/00* (2006.01)
*B64F 1/22* (2006.01)
*A01B 79/00* (2006.01)

(52) U.S. Cl.
CPC ............ *B64F 1/222* (2013.01); *A01B 79/005* (2013.01); *B64C 2201/021* (2013.01); *B64C 2201/024* (2013.01); *B64C 2201/12* (2013.01); *B64C 2201/123* (2013.01); *B64C 2201/182* (2013.01); *B64C 2201/208* (2013.01)

(58) Field of Classification Search
CPC ......... B64C 2201/021; B64C 2201/123; B64F 1/222; B64F 1/007
See application file for complete search history.

(56) References Cited

U.S. PATENT DOCUMENTS

| | | | |
|---|---|---|---|
| 8,392,045 B2 | 3/2013 | Vian et al. | |
| 8,511,606 B1 | 8/2013 | Lutke et al. | |
| 8,620,510 B1 | 12/2013 | Meuth et al. | |
| 8,643,719 B2 | 2/2014 | Vian et al. | |
| 8,788,119 B2 | 7/2014 | Tillotson et al. | |
| 8,812,154 B2 | 8/2014 | Vian et al. | |
| 9,063,544 B2 | 6/2015 | Vian et al. | |
| 9,064,222 B2 | 6/2015 | Saad et al. | |
| 2009/0314883 A1* | 12/2009 | Arlton | B64C 39/024 244/63 |
| 2009/0319096 A1 | 12/2009 | Offer et al. | |
| 2010/0211358 A1 | 8/2010 | Kesler et al. | |
| 2010/0312387 A1 | 12/2010 | Jang et al. | |
| 2010/0312388 A1 | 12/2010 | Jang et al. | |
| 2012/0261144 A1 | 10/2012 | Vian et al. | |
| 2014/0025228 A1 | 1/2014 | Jang et al. | |
| 2014/0077969 A1 | 3/2014 | Vian et al. | |
| 2014/0081479 A1 | 3/2014 | Vian et al. | |
| 2014/0111332 A1 | 4/2014 | Przybylko et al. | |
| 2014/0163781 A1 | 6/2014 | Vian et al. | |
| 2014/0303814 A1* | 10/2014 | Burema | A01B 79/005 701/3 |
| 2015/0102154 A1 | 4/2015 | Duncan et al. | |
| 2016/0009413 A1 | 1/2016 | Lee et al. | |
| 2016/0144734 A1* | 5/2016 | Wang | B60L 11/1822 701/17 |
| 2016/0225263 A1* | 8/2016 | Salentiny | G08G 5/003 |
| 2016/0244187 A1* | 8/2016 | Byers | B64F 5/0045 |

FOREIGN PATENT DOCUMENTS

| | | |
|---|---|---|
| EP | 2644438 A2 | 10/2013 |
| WO | WO02062663 A1 | 8/2002 |

OTHER PUBLICATIONS

Vian et al., "Search Area Coverage System and Method," U.S. Appl. No. 12/960,440, filed Dec. 3, 2010, 53 pages.

"Using UAVs to Enhance the Quality of Precision Agriculture," Boeing, Engineering, Operations & Technology, Oct. 2013, 22 pages.

Extended European Search Report, dated Mar. 20, 2017, regarding Application No. EP16177647.1, 7 pages.

\* cited by examiner

AERIAL AGRICULTURAL MANAGEMENT SYSTEM

BACKGROUND INFORMATION

1. Field

The present disclosure relates generally to agriculture and, in particular, to an agriculture management system. Still more particularly, the present disclosure relates to a method and apparatus for managing agricultural regions.

2. Background

Agriculture involves the cultivation of plants, animals, and other life forms in agricultural regions as resources. The products of agriculture regions may be used for food, fuel, medicines, and other purposes.

Production in agricultural regions are often managed to increase the production in those regions. The management of an agricultural region may be fairly complex. For example, irrigation, insect infestation management, soil erosion management, managing nutrient runoffs, weed control, bird control, crop selection, and other task are performed in managing the production in the agricultural region.

Having information about the agricultural region is important for identifying and implementing tasks for managing an agricultural region. Sensors may be placed on the land in the agricultural region to collect sensor data. For example, sensors may be present to detect moisture for purposes for irrigation.

Sensor systems on the land, however, may be impractical, depending on the size of the agricultural region. For example, if the agricultural region is about twenty thousand acres, installing sensors on the land in the agricultural region to detect moisture or growth of crops may cost more than desired, and maintenance of the sensor system may be more than desired.

As another example, satellite images may be used to obtain information about the agricultural region. The satellite images, however, may not provide information as frequently as desired when compared to sensors on the land. Also, the resolution of satellite images may not be as great as desired for analysis. For example, the images may not have a quality that allows for identifying features in the agricultural region needed for analysis.

Another system includes the use of aircraft. Manned and unmanned aircraft may fly over the agricultural region and generate images and other types of sensor data about the agricultural region. Using manned aircraft may be less convenient and more costly than desired. Flights need to be scheduled, and fuel is needed to fly from the airport to the agricultural region and back to the airport.

Unmanned aircraft in the form of unmanned aerial vehicles (UAVs) are being used more and more often. These types of aircraft are more convenient and less expensive than manned aircraft.

However, using unmanned aerial vehicles involves having human operators launch and retrieve the unmanned aerial vehicles after the unmanned aerial vehicles fly a mission over the agricultural region. These launch and retrieval operations are considered high workload operations that may require more personnel than desired. Also, time and effort that occur to retrieve and send the sensor data for analysis from the unmanned aerial vehicles may be more than desired.

The current systems may not generate sensor data for analysis about agricultural regions as quickly as desired to prevent or reduce damage. The time needed to obtain sensor data about an agricultural region may not identify an insect infestation until large amounts of damage has been done to the crop in the agricultural region.

For example, the potato beetle may cause significant damage to potato crops, tomato crops, and eggplant crops in a matter of a day or several days. Currently used systems for obtaining sensor data about agricultural regions may not provide information about such an infestation quickly enough to prevent or reduce damage to crops by the potato beetles.

Therefore, it would be desirable to have a method and apparatus that take into account at least some of the issues discussed above, as well as other possible issues. For example, it would be desirable to have a method and apparatus that overcome a technical problem with obtaining information about an agricultural region as efficiently as desired.

SUMMARY

In one illustrative embodiment, an apparatus is provided. The apparatus comprises a base vehicle, a takeoff and landing system associated with the base vehicle, a rack system associated with the base vehicle, a refueling system associated with the base vehicle, and a controller associated with the base vehicle. The rack system comprises a group of racks with slots in which the slots are configured to receive unmanned aerial vehicles, provide refueling connections that facilitate refueling of the unmanned aerial vehicles located in the slots and provide data connections that facilitate data transmission with the unmanned aerial vehicles located in the slots. The refueling system is configured to refuel an unmanned aerial vehicle in the unmanned aerial vehicles located in a slot using a refueling connection in the refueling connections. The controller is configured to communicate with the unmanned aerial vehicle using a data connection in the data connections and control the refueling of the unmanned aerial vehicles by the refueling system while the unmanned aerial vehicle is in the slot, enabling exchanging data with the unmanned aerial vehicle and the refueling of the unmanned aerial vehicle simultaneously.

A further illustrative embodiment of the present disclosure provides an unmanned aerial vehicle. The unmanned aerial vehicle comprises a semi-trailer truck, a launching and recovery system associated with the semi-trailer truck, a rack system associated with the semi-trailer truck, a refueling system associated with the semi-trailer truck, a controller associated with the semi-trailer truck, and a door system on the semi-trailer truck that are moveable. The launching and recovery system is configured to launch and recover unmanned aerial vehicles. The rack system comprises slots in a group of racks configured to receive the unmanned aerial vehicles, provide refueling connections that facilitate refueling of the unmanned aerial vehicles located in the slots, and provide data connections that facilitate data transmission with the unmanned aerial vehicles located in the slots. The refueling system is configured to refuel the unmanned aerial vehicle in the unmanned aerial vehicles located in the slots using the refueling connections. The controller is configured to communicate with the unmanned aerial vehicles using the data connections and control the refueling of the unmanned aerial vehicles by the refueling system while the unmanned aerial vehicles are in the slots, control a flight of a group of the unmanned aerial vehicles over an agricultural region such that the group of the unmanned aerial vehicles generate sensor data about the agricultural region; download the sensor data from the group of the unmanned aerial vehicles over a group of the data connections for a group of the slots in which the group of the unmanned aerial vehicles are placed after the flight of the group of the unmanned aerial vehicles. The door system facilitate launching and recovery of the unmanned aerial vehicles.

A yet further illustrative embodiment of the present disclosure provides a method for surveying an agricultural region. A flight of a group of unmanned aerial vehicles from a takeoff and landing system associated with a base vehicle is initiated. The group of the unmanned aerial vehicles flies over the agricultural region and generate sensor data about the agricultural region. The group of unmanned aerial vehicles are recovered after the flight over the agricultural region is completed. The group of unmanned aerial vehicles from the takeoff and landing system are moved into a group of slots in a rack system. Sensor data from the group of the unmanned aerial vehicles is downloaded using data connections while the group of unmanned aerial vehicles is in the group of the slots. The group of the unmanned aerial vehicles is refueled using a refueling system while the group of unmanned aerial vehicles is in the group of slots, wherein simultaneous downloading of sensor data refueling of the group of unmanned aerial vehicles is enabled.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following a detailed description of illustrative embodiments of the present disclosure when read in conjunction with the accompanying drawings, wherein:

DETAILED DESCRIPTION

The illustrative embodiments recognize and take into account one or more different considerations. For example, the illustrative embodiments recognize and take into account that the cost and human labor used to obtain sensor data about an agricultural region may reduce the frequency or accuracy of the sensor data obtained. As a result, sensor data may not be obtained as quickly as desired to identify undesired conditions in an agricultural region. When undesired conditions are not identified quickly enough, the performance of actions to counter the undesired condition may not occur quickly enough to reduce damage to the crops or other resources being produced in the agricultural region.

Thus, the illustrative embodiments provide a method and apparatus to manage an agricultural region. In one example, an apparatus comprises a base vehicle, a takeoff and landing system, a rack system, a refueling system, and a controller. The rack system comprises a group of racks with slots in which the slots are configured to receive the unmanned aerial vehicles, provide refueling connections that facilitate refueling of the unmanned aerial vehicles located in the slots, and provide data connections that facilitate data transmission with the unmanned aerial vehicles located in the slots. As used herein, "a group of", when used with reference to items, means one or more items. For example, "a group of racks" is one or more racks.

The refueling system is configured to refuel an unmanned aerial vehicle in unmanned aerial vehicles located in a slot in the slot using a refueling connection in the refueling connections. The controller is configured to communicate with the unmanned aerial vehicle using a data connection in the data connections and control refueling of the unmanned aerial vehicles by the refueling system while the unmanned aerial vehicle is in the slot, thus enabling exchanging data with the unmanned aerial vehicle and refueling the unmanned aerial vehicle simultaneously.

Figure 1:
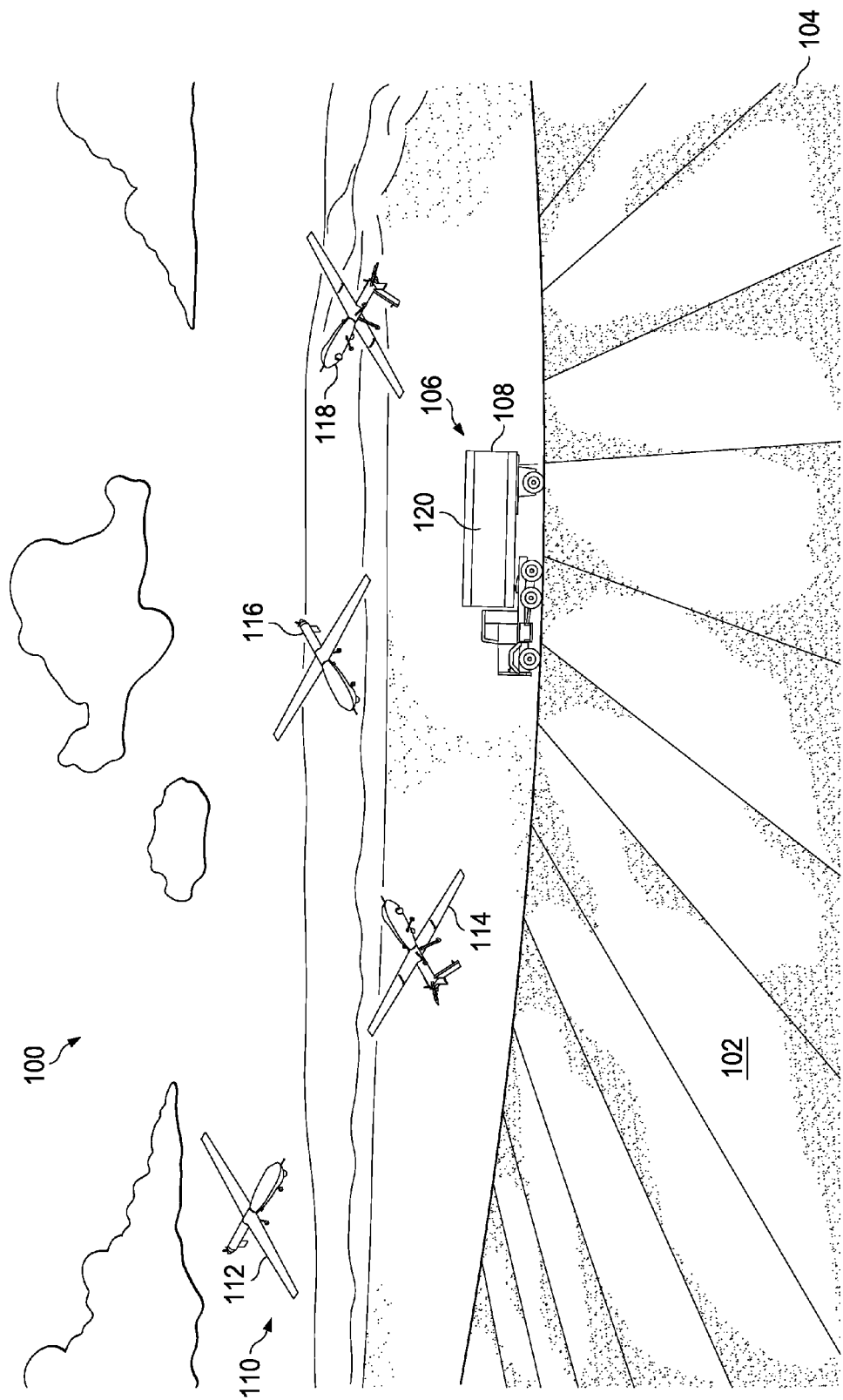
FIG. 1 is an illustration of an agricultural environment in accordance with an illustrative embodiment.

With reference now to the figures, and, in particular, with reference to FIG. 1, an illustration of an agricultural environment is depicted in accordance with an illustrative embodiment. Agricultural environment 100 includes agricultural region 102. In this illustrative example, crops 104 grow in agricultural region 102.

Unmanned aerial vehicle system 106 includes semi-trailer truck 108 that autonomously launches and retrieves unmanned aerial vehicles 110, which include unmanned aerial vehicle 112, unmanned aerial vehicle 114, unmanned aerial vehicle 116, and unmanned aerial vehicle 118 in this illustrative example. Other unmanned aerial vehicles, not shown, may be stored within semi-trailer truck 108.

As depicted, controller 120 in semi-trailer truck 108 controls the flight of unmanned aerial vehicles 110 over crops 104 for agricultural region 102. As unmanned aerial vehicles 110 fly over agricultural region 102, unmanned area vehicles 110 generate sensor data about agricultural region 102.

When the flight of unmanned aerial vehicles 110 is complete, unmanned aerial vehicles 110 return to semi-trailer truck 108. In this illustrative example, semi-trailer truck 108 autonomously retrieves unmanned aerial vehicles 110.

Additionally, controller 120 retrieves sensor data from unmanned aerial vehicles 110 that return to semi-trailer truck 108. Additionally, controller 120 controls refueling of unmanned aerial vehicles 110 within semi-trailer truck 108 to make unmanned aerial vehicles 110 within semi-trailer truck 108 ready for additional missions.

As a result, unmanned aerial vehicle system 106 provides an automated launch and retrieval of unmanned aerial vehicles 110. Additionally, unmanned aerial vehicle system 106 also provides for multi-vehicle coordination, automated refueling, data handling, and other features that reduce the cost and time in obtaining information about large areas, such as agricultural region 102.

The illustration of agricultural environment 100 is not meant to limit the manner in which different illustrative embodiments may be implemented. For example, other numbers of unmanned aerial vehicles 110 may be used. For example, unmanned aerial vehicle system 106 may manage three, eight, ten, twenty-three, or some other number of unmanned aerial vehicles. Additionally, the unmanned vehicles may be of the same or different types. In still another illustrative example, unmanned aerial vehicle system 106 may include one or more semi-trailer trucks in addition to semi-trailer truck 108.

Figure 2:
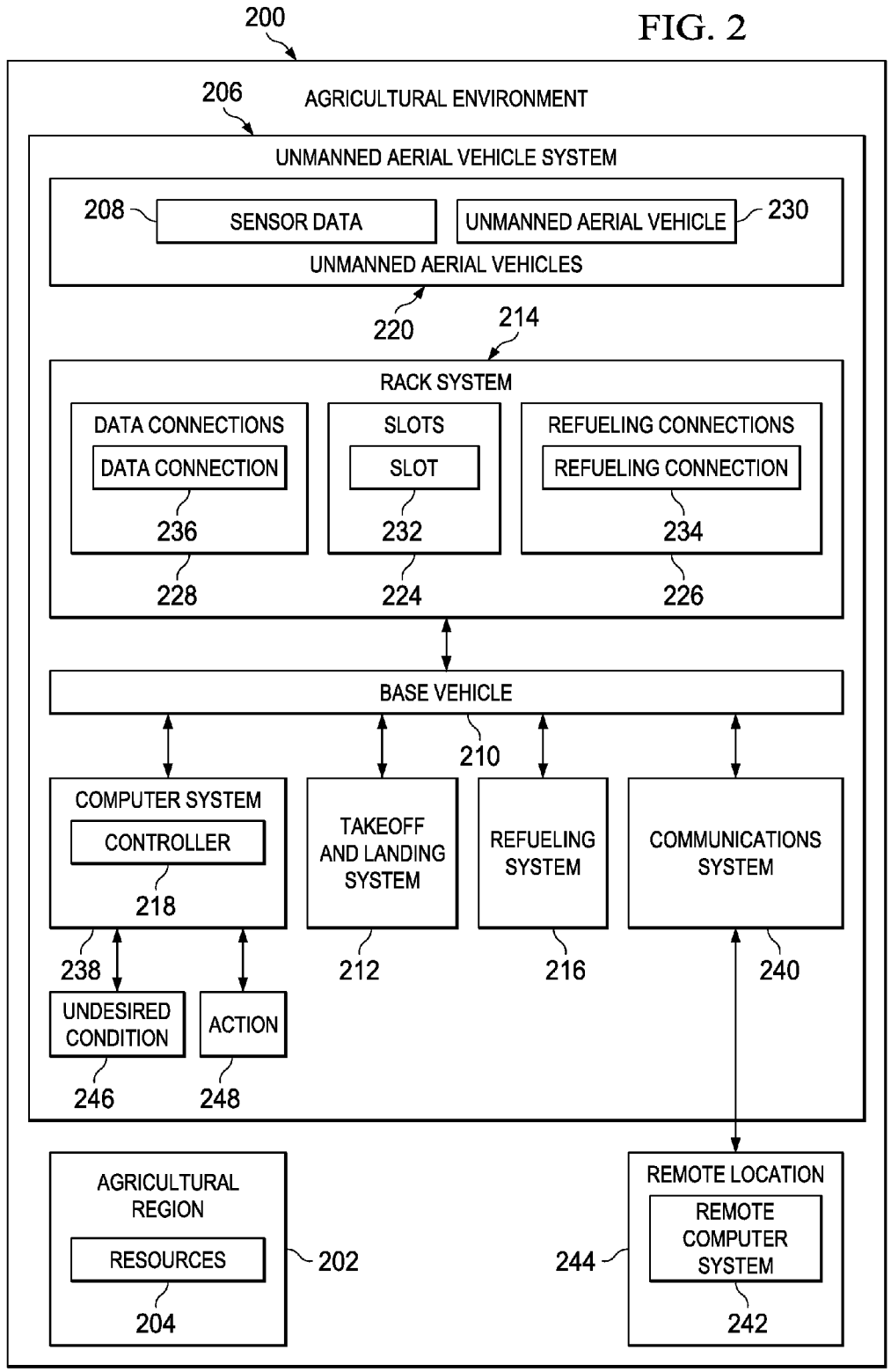
FIG. 2 is an illustration of a block diagram of an agricultural environment in accordance with an illustrative embodiment.

With reference now to FIG. 2, an illustration of a block diagram of an agricultural environment is depicted in accordance with an illustrative embodiment. Agricultural environment 100 of FIG. 1 is an example of a physical limitation of agricultural environment 200 in FIG. 2. The block diagram of agricultural environment 200 shows functional components that may be used in agricultural environment 100.

As depicted, agricultural environment 200 includes agricultural region 202. Agricultural region 202 is an area of land, which may be contiguous or noncontiguous.

Agricultural region 202 produces resources 204. Resources 204 maybe selected from at least one of plants, animals, fungi, or other suitable lifeforms that may be grown, cultivated, raised, or some combination thereof.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

In this illustrative example, unmanned aerial vehicle system 206 is a physical system that operates to generate sensor data 208 about agricultural region 202. Sensor data 208 is used to manage agricultural region 202. As depicted, sensor data 208 includes images, timestamps, position information, temperature readings, and other suitable types of information.

Unmanned aerial vehicle system 206 is comprised of different physical components. As depicted, unmanned aerial vehicle system 206 includes base vehicle 210, takeoff and landing system 212, rack system 214, refueling system 216, controller 218, and unmanned aerial vehicles 220.

Base vehicle 210 is a mobile platform with which takeoff and landing system 212, rack system 214, refueling system 216, controller 218 are associated. When one component is "associated" with another component, the association is a physical association. For example, a first component, rack system 214, may be considered to be physically associated with a second component, base vehicle 210, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

In the illustrative example, base vehicle 210 is powered. In other words, base vehicle 210 moves under its own power. For example, base vehicle 210 may include a propulsion system that moves base vehicle 210. In other illustrative examples, base vehicle 210 may be an unpowered vehicle that is pushed or pulled. Base vehicle 210 is selected from a group comprising a truck, a sport utility vehicle, a trailer, a train, a semi-trailer truck, or some other suitable type of vehicle. In the illustrative example, a semi-trailer truck comprises a tractor unit and one or more semi-trailers.

As depicted, takeoff and landing system 212 is associated with base vehicle 210 and is a system from which unmanned aerial vehicles 220 takeoff and land. In the illustrative example, unmanned aerial vehicles 220 may takeoff unassisted, land unassisted, takeoff with assistance, land with assistance, or some combination thereof. Unmanned aerial vehicles 220 are selected from at least one of an airplane, a helicopter, an ornithopter, a quadcopter, or some other suitable types of unmanned aerial vehicles. Unmanned aerial vehicles 220 may be all of the same type or different types. In other words, unmanned aerial vehicles 220 may be heterogeneous or homogeneous in composition.

Unmanned aerial vehicles 220 may be launched from takeoff and landing system 212. In another example, unmanned aerial vehicles 220 may takeoff under their own power from takeoff and landing system 212. In another example, unmanned aerial vehicles 220 may land on a platform in takeoff and landing system 212 under their own power. In yet another illustrative example, unmanned aerial vehicles 220 may be caught in midair by takeoff and landing system 212.

In this illustrative example, rack system 214 is associated with base vehicle 210. Rack system 214 provides a structure to hold unmanned aerial vehicles 220. Rack system 214 provides a location for at least one of storage, refueling, data transfer, or other suitable functions in which unmanned aerial vehicles 220 are held in slots 224.

Slots 224 are volumes in rack system 214. In this example, slots 224 are configured to receive unmanned aerial vehicles 220, provide refueling connections 226 that facilitate refueling of unmanned aerial vehicles 220 located in slots 224, and provide data connections 228 that facilitate data transmission with the unmanned aerial vehicles located in the slots.

Refueling system 216 is associated with base vehicle 210. As depicted, refueling system 216 is configured to refuel unmanned aerial vehicle 230 in unmanned aerial vehicles 220 when unmanned area vehicle 230 is located in slot 232 in slots 224 using refueling connection 234 in refueling connections 226.

In the illustrative example, controller 218 is associated with base vehicle 210. As depicted, controller 218 is configured to communicate with unmanned aerial vehicle 230 using data connection 236 in data connections 228 and control refueling of unmanned aerial vehicle 230 by refueling system 216 while unmanned aerial vehicle 230 is in slot 232, enabling exchanging data with unmanned aerial vehicle 230 and refueling unmanned aerial vehicle 230 simultaneously.

During operation, controller 218 controls a flight of a group of unmanned aerial vehicles 220 over agricultural region 202. This flight is such that the group of unmanned aerial vehicles 220 generates sensor data 208 about agricultural region 202. Controller 218 also downloads sensor data 208 from the group of unmanned aerial vehicles 220 over a group of data connections 228 for a group of slots 224 in which the group of unmanned aerial vehicles 220 are placed after the flight of the group of unmanned aerial vehicles 220.

In the illustrative example, controller 218 may perform pre-processing of sensor data 208. For example, controller 218 may be configured to process sensor data 208 received from unmanned aerial vehicles 220. For example, the pre-processing may be to remove noise in sensor data 208, identify features in images in sensor data 208, or some other types of processing sensor data 208.

Also, controller 218 may identify undesired condition 246 in agricultural region 202 using the sensor data 208. Controller 218 also may be configured to identify action 248 based on undesired condition 246 in agricultural region 202 when undesired condition 246 in agricultural region 202 is present.

In the illustrative example, undesired condition 246 may take different forms. For example, undesired condition 246 may be selected from a group comprising an undesired level of moisture, an insect infestation, soil erosion, a nutrient runoff, weed control, and other undesired conditions that may affect production in agricultural region 202.

Action 248 may take different forms. For example, action 248 may be selected from a group comprising sending an alert, generating a report, analyzing undesired condition 246, identifying a corrective action to reduce undesired condition 246, generating a prescription to correct undesired condition 246, sending a command to control an irrigation system in agricultural region 202, and other suitable actions.

Controller 218 is implemented in software, hardware, firmware, or a combination thereof. When software is used, the operations performed by controller may be implemented in program code configured to run on hardware, such as a processor unit. When firmware is used, the operations performed by controller 218 may be implemented in program code and data and stored in persistent memory to run on a processor unit. When hardware is employed, the hardware may include circuits that operate to perform the operations in controller 218.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this example, controller 218 may be located in computer system 238 associated with base vehicle 210. Computer system 238 is a hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, unmanned aerial vehicle system 206 may also include communications system 240. Communications system 240 is configured to allow controller 218 to communicate with remote computer system 242 in a remote location 244. For example, controller 218 may send sensor data 208 in a processed or unprocessed form to remote computer system 242. Controller 218 may receive instructions, such as other agricultural regions for data collection, type of sensor data desired, or other instructions.

Communication using communications system 240 may occur using different types of devices. For example, communications system 240 may include using at least one of a wireless communications system, a satellite communications system, or some other suitable communications system.

In one illustrative example, one or more technical solutions are present that overcome a technical problem with obtaining information about an agricultural region 202 as efficiently as desired. As a result, one or more technical solutions may provide a technical effect identifying undesired conditions quickly enough to take actions to reduce the undesired conditions.

Figure 3:
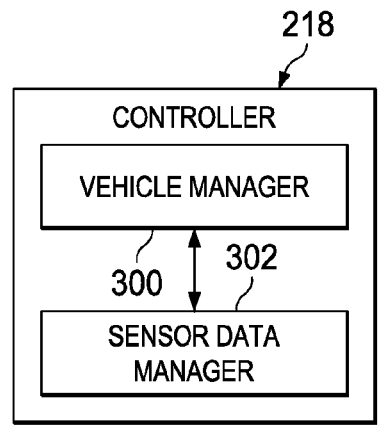
FIG. 3 is an illustration of a block diagram of a controller in accordance with an illustrative embodiment.

Turning next to FIG. 3, an illustration of a block diagram of a controller is depicted in accordance with an illustrative embodiment. In the illustrative examples, the same reference numeral may be used in more than one figure. This reuse of a reference numeral in different figures represents the same element in the different figures.

As depicted, controller includes several components. In this example, controller 218 comprises vehicle manager 300 and sensor data manager 302. Vehicle manager 300 is configured to communicate with unmanned aerial vehicles 220 using data connections 228 and control refueling of unmanned aerial vehicles 220 while unmanned aerial vehicles 220 are located in slots 224 in the group of racks 400 in FIG. 4.

Further, vehicle manager 300 also may be configured to monitor the health of unmanned aerial vehicles 220 and determines whether maintenance is needed for unmanned aerial vehicles 220. The monitoring may occur while unmanned aerial vehicles 220 are in slots 224 using data connections 228. In one illustrative example, monitoring may occur during flight of unmanned aerial vehicles 220 using wireless connections. In this manner, vehicle manager 300 may identify the flight worthiness of unmanned aerial vehicles 220 and conditions of unmanned aerial vehicles 220 that may need maintenance.

As depicted, sensor data manager 302 is in communication with vehicle manager 300. Sensor data manager 302 is configured to retrieve sensor data 208 from unmanned aerial vehicles 220 located in slots 224. Sensor data manager 302 is configured to download and store sensor data 208 from unmanned aerial vehicles 220 using data connections 228 in slots 224. Sensor data manager 302 may store and transmit sensor data 208 using communications system 240 in FIG. 2.

Figure 4:
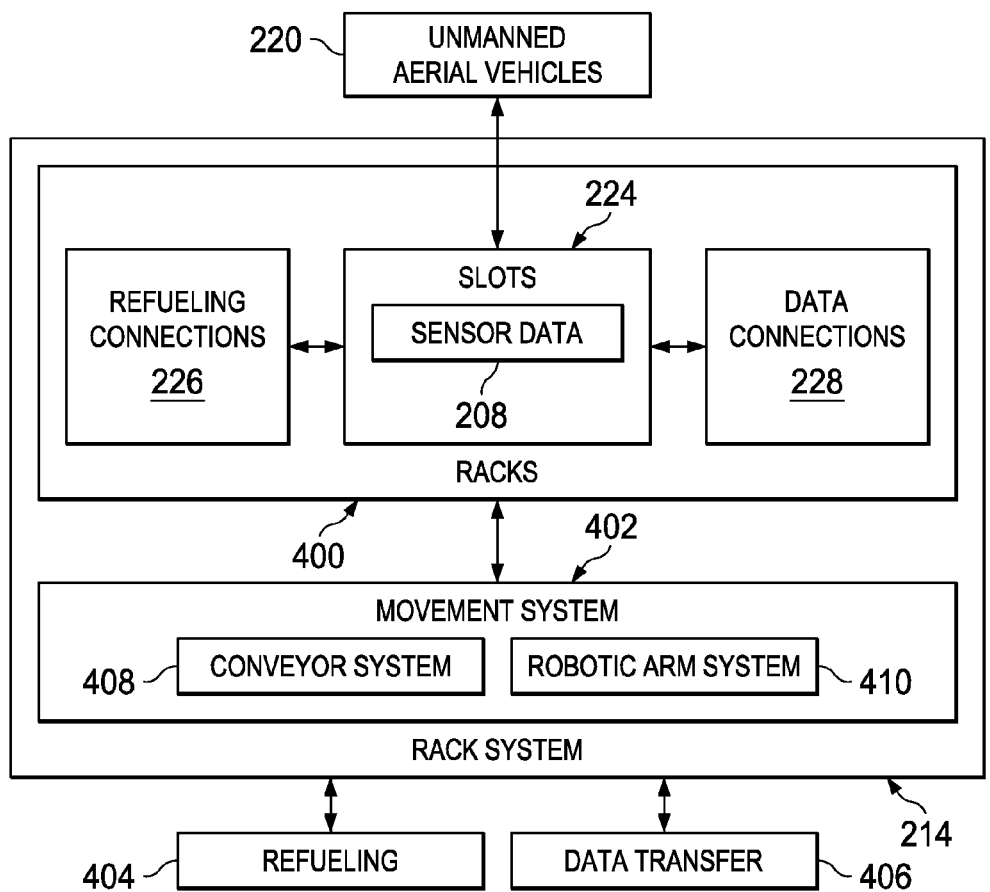
FIG. 4 is an illustration of a block diagram of a rack system in accordance with an illustrative embodiment.

FIG. 4 is an illustration of a block diagram of a rack system in accordance with an illustrative embodiment. In this illustrative example, rack system 214 is comprised of a group of racks 400 and movement system 402. As used herein, "a group of", when used with reference to items, means one or more items. For example, "a group of racks 400" is one or more of racks 400. Slots 224 are located within the group of racks 400.

As depicted, slots 224 in the group of racks 400 have refueling connections 226 and data connections 228. These connections provide an ability to facilitate at least one of refueling 404 using refueling connections 226 or data transfer 406 using data connections 228 with unmanned aerial vehicles 220 located in slots 224. Both refueling 404 and data transfer 406 may occur at substantially the same time. In this manner, simultaneous refueling 404 and data transfer 406 reduce the time needed to ready unmanned aerial vehicles 220 for flying additional missions to generate sensor data 208.

In one illustrative example, refueling connections 226 and data connections 228 may be electrical contacts. In another illustrative example, data connections 228 may be a wireless connection, and refueling connections 226 may use magnetic fields for wireless inductive refueling.

In the illustrative example, data transfer 406 includes downloading sensor data 208 from unmanned aerial vehicles 220. Sensor data 208 may also include health information about unmanned aerial vehicles 220 in addition to information about agricultural region 202.

Data transfer 406 also may include uploading information. For example, instructions, routes, settings, and other information may be uploaded to unmanned aerial vehicles 220.

In the illustrative example, movement system 402 is configured to move unmanned aerial vehicle 230 between slot 232 and takeoff and landing system 212. Movement system 402 may take different forms. In one illustrative example, movement system 402 comprises conveyor system 408 and robotic arm system 410. Conveyor system 408 is configured to move unmanned aerial vehicle 230 on conveyer system 408 between a group of racks 400 and takeoff and landing system 212. As depicted, a robotic arm system 410 is configured to move unmanned aerial vehicle 230 between slot 232 and conveyer system 408 and move unmanned aerial vehicle 230 between conveyor system 408 and takeoff and landing system 212. For example, movement system 402 may configured to move unmanned aerial vehicle 230 to takeoff and landing system 212 from slot 232 in slots 224 and to slot 232 from takeoff and landing system 212.

Figure 5:
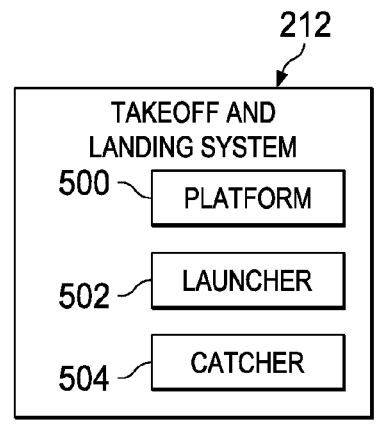
FIG. 5 is an illustration of a block diagram of a takeoff and landing system in accordance with an illustrative embodiment.

FIG. 5 is an illustration of a block diagram of a takeoff and landing system in accordance with an illustrative embodiment. As depicted, takeoff and landing system 212 may include platform 500. Platform 500 may be used when unmanned aerial vehicle 230 is able to take off and land without assistance. For example, platform 500 may be used by unmanned aerial vehicle 230 in the form of a quadcopter.

In another illustrative example, takeoff and landing system 212 may include launcher 502 and catcher 504. Launcher 502 may be, for example, a catapult launcher that uses compressed air or a rail system to launch unmanned aerial vehicle 230.

Catcher 504 is a mechanism that recovers unmanned aerial vehicle 230 while unmanned area vehicle 230 is still in the air. Catcher 504 may include at least one of a towline system, a skyhook, a net, or some other suitable mechanism for recovering unmanned aerial vehicle 230. This type of system may be useful when unmanned area vehicle 230 takes the form of an airplane.

Figure 6:
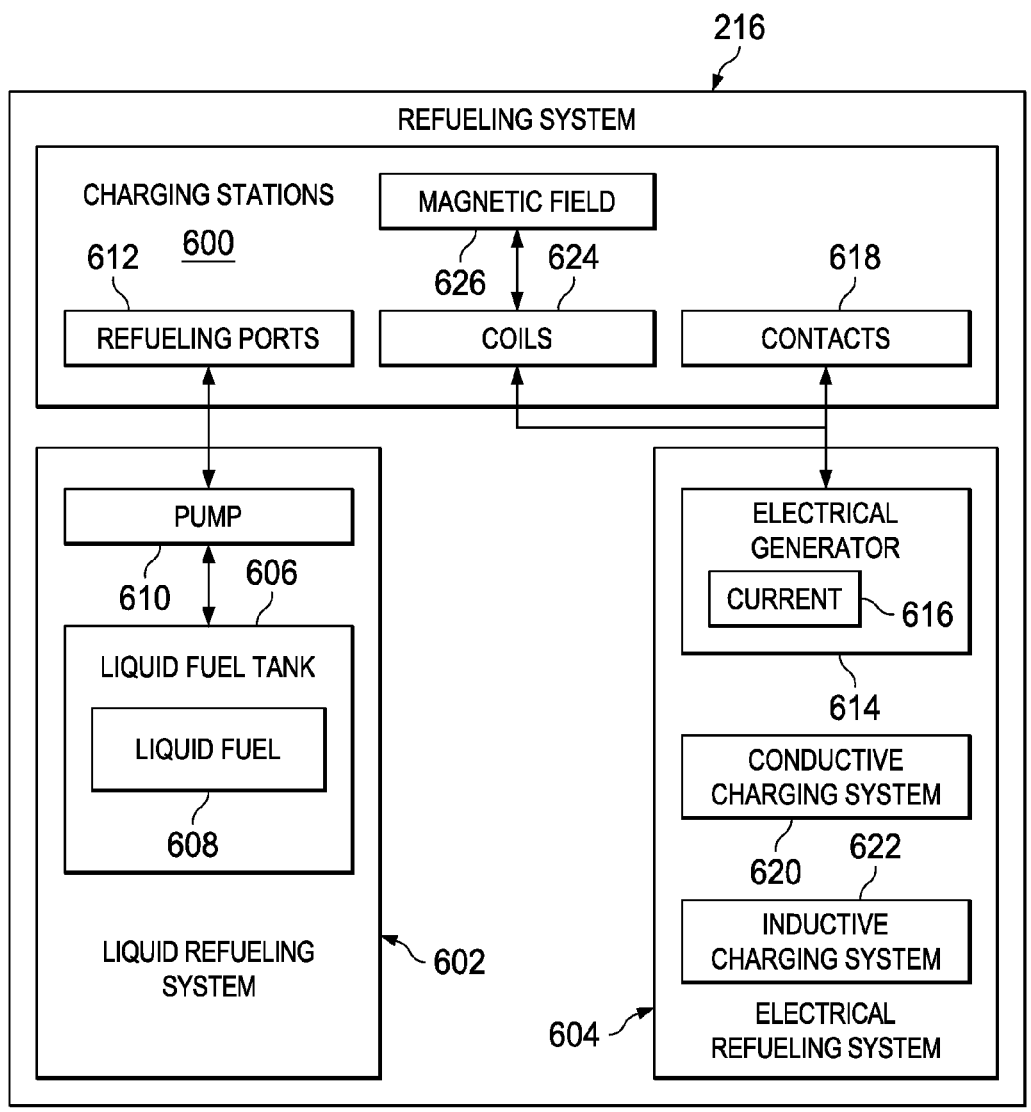
FIG. 6 is an illustration of a block diagram of a refueling system in accordance with an illustrative embodiment.

In FIG. 6, an illustration of a block diagram of a refueling system is depicted in accordance with an illustrative embodiment. In this illustrative example, refueling system 216 includes charging stations 600 and at least one of liquid refueling system 602 or electrical refueling system 604.

Charging stations 600 are located within slots 224. Charging stations 600 include refueling connections 226. With liquid refueling system 602, refueling connections 226 are refueling ports 612 that may take the form of nozzles, syringe injection systems, or some other suitable mechanism. When electrical refueling system 604 is present, refueling connections 226 may take the form of contacts 618. When inductive charging is used, then refueling connections 226 may include coils that generate a magnetic field for inductive charging.

In this illustrative example, liquid refueling system 602 has liquid fuel tank 606 that holds liquid fuel 608. Liquid fuel 608 may be, for example, gasoline, diesel fuel, or some other type of liquid fuel. Pump 610 in liquid refueling system 602 transfers liquid fuel 608 from liquid fuel tank 606 to refueling ports 612 in refueling connections 226 in charging stations 600.

As depicted, electrical refueling system 604 includes electrical generator 614. Electrical generator 614 generates current 616. Current 616 is sent to refueling connections 226 in charging stations 600.

For example, current 616 may flow into unmanned aerial vehicles 220 through contacts 618 in refueling connections 226 in charging stations 600 when electrical refueling system 604 is conductive charging system 620. When electrical refueling system 604 takes the form of inductive charging system 622, current 616 is sent into coils 624 in refueling connections 226 in charging stations 600 that generate magnetic field 626.

Thus, refueling system 216 may take different forms. As discussed above, refueling system 216 may be selected from at least one of inductive charging system 622, conductive charging system 620, or liquid refueling system 602.

Figure 7:
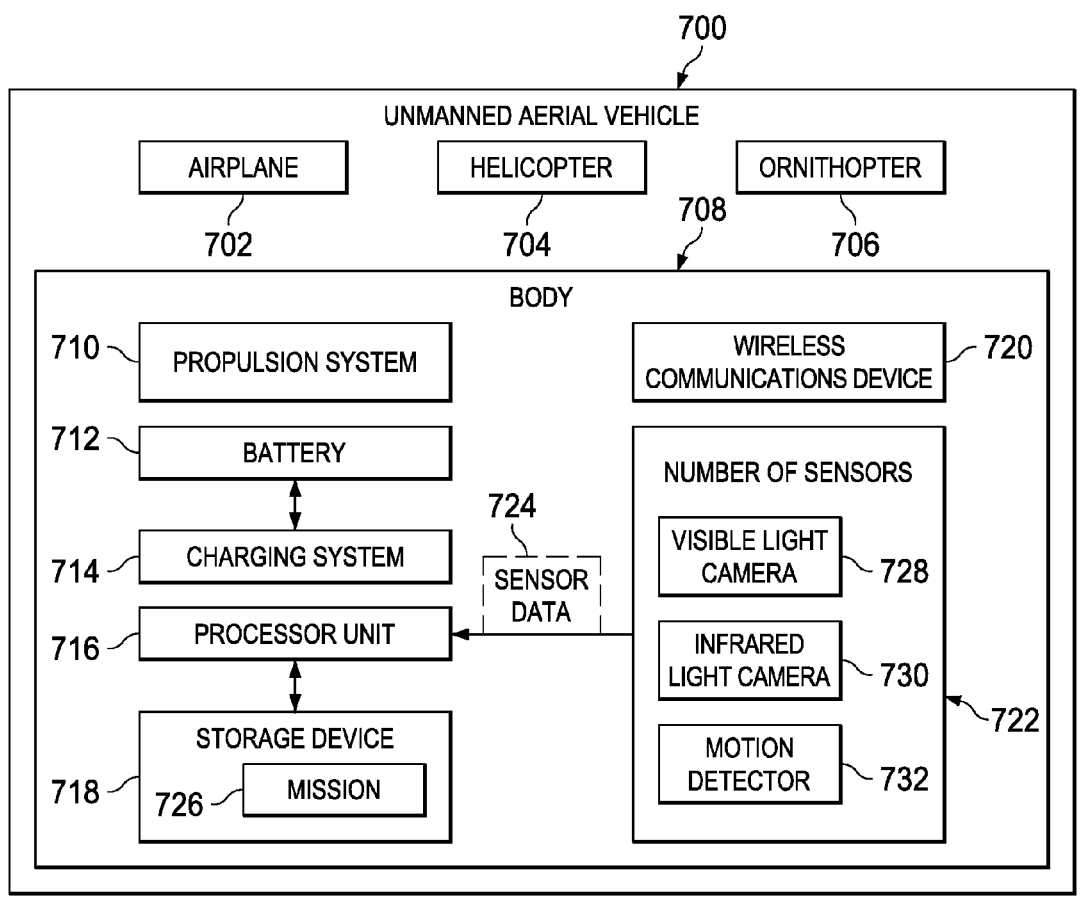
FIG. 7 is an illustration of a block diagram of an unmanned aerial vehicle in accordance with an illustrative embodiment.

With reference next to FIG. 7, an illustration of a block diagram of an unmanned aerial vehicle is depicted in accordance with an illustrative embodiment. Unmanned aerial vehicle 700 is an example of one implementation for one or more of unmanned aerial vehicles 220 in FIG. 2. As depicted, unmanned aerial vehicle 700 may take to the form of airplane 702, helicopter 704, ornithopter 706, or other suitable forms.

In this illustrative example, unmanned aerial vehicle 700 includes body 708, propulsion system 710, battery 712, charging system 714, processor unit 716, storage device 718, wireless communications device 720, and number of sensors 722. Body 708 provides a structure in which the different components of unmanned aerial vehicle 700 may be associated with each other. For example, without limitation, body 708 may be a fuselage. Further, body 708 may include aerodynamic surfaces such as wings or other types of surfaces.

Propulsion system 710 is configured to move unmanned aerial vehicle 700 in the air. Propulsion system 710 may be, for example, without limitation, an electric motor configured to rotate a propeller or other type of blade. In other examples, propulsion system 710 may be configured to move wings on body 708 when unmanned aerial vehicle 700 takes the form of ornithopter 706. Battery 712 provides electrical energy for unmanned aerial vehicle 700. Charging system 714 is connected to battery 712 and allows battery 712 to be recharged at a charging station.

Charging system 714 may include inductive coils for an inductive charging system or conductive contacts for a conductive charging system. In some advantageous embodiments, charging system 714 also may be used to transfer data. As one illustrative example, charging system 714 may provide a modulated charge as a carrier frequency. This modulated charge allows for the transfer of data in addition to the providing of power.

As another illustrative example, conductive contacts in charging system 714 may be used to transfer data. In other examples, power may be provided wirelessly by charging system 714 using microwaves or a laser.

Processor unit 716 runs a number of programs for missions in these illustrative examples. Storage device 718 may store sensor data 724 generated by number of sensors 722. Additionally, storage device 718 may store mission 726 that is executed or run by processor unit 716. Mission 726 may include at least one of a program, an identification of a target, or other suitable types of information.

Wireless communications device 720 is configured to provide communications between unmanned aerial vehicle 700 and unmanned aerial vehicle 206 in FIG. 2 or remote computer system 242 in remote location 244 in FIG. 2. In the illustrative example, number of sensors 722 may include at least one of visible light camera 728, infrared light camera 730, motion detector 732, or other suitable types of sensors that may be used to generate sensor data 724.

Figure 8:
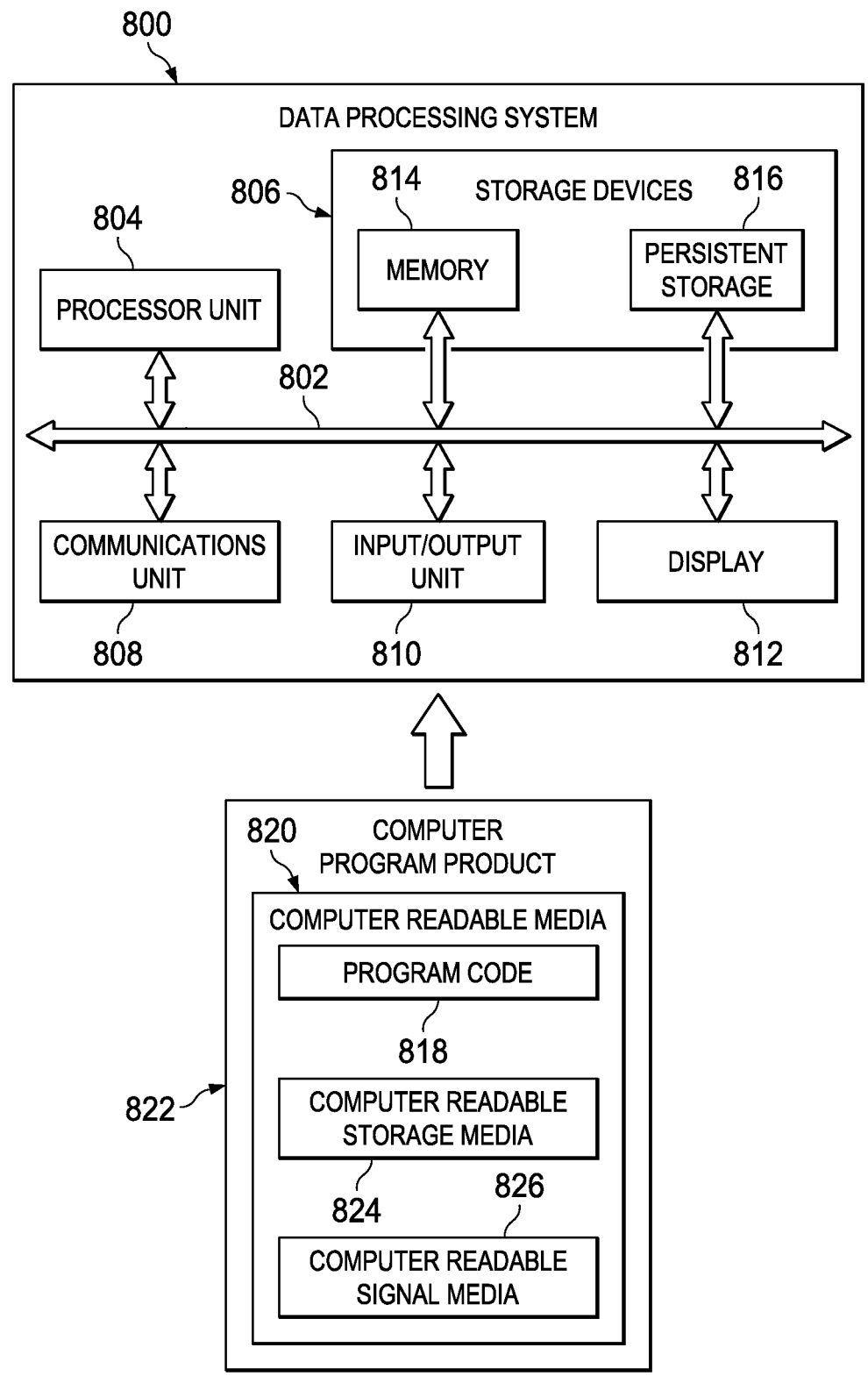
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement one or more data processing systems in computer system 238 and remote computer system 242 in FIG. 2.

In this illustrative example, data processing system 800 includes communications framework 802, which provides communications between processor unit 804, memory 814, persistent storage 816, communications unit 808, input/output (I/O) unit 810, and display 812. In this example, communications framework 802 may take the form of a bus system.

Processor unit 804 serves to execute instructions for software that may be loaded into memory 814. Processor unit 804 may be a number of processors, a multi-processor core, or some other type of processor, depending on the particular implementation.

Memory 814 and persistent storage 816 are examples of storage devices 806. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 806 may also be referred to as computer readable storage devices in these illustrative examples. Memory 814, in these examples, may be, for example, a random access memory or any other suitable volatile or non-volatile storage device. Persistent storage 816 may take various forms, depending on the particular implementation.

For example, persistent storage 816 may contain one or more components or devices. For example, persistent storage 816 may be a hard drive, a solid state hard drive, a flash memory, a rewritable optical disk, a rewritable magnetic tape, or some combination of the above. The media used by persistent storage 816 also may be removable. For example, a removable hard drive may be used for persistent storage 816.

Communications unit 808, in these illustrative examples, provides for communications with other data processing systems or devices. In these illustrative examples, communications unit 808 is a network interface card.

Input/output unit 810 allows for input and output of data with other devices that may be connected to data processing system 800. For example, input/output unit 810 may provide a connection for user input through at least one of a keyboard, a mouse, or some other suitable input device. Further, input/output unit 810 may send output to a printer. Display 812 provides a mechanism to display information to a user.

Instructions for at least one of the operating system, applications, or programs may be located in storage devices 806, which are in communication with processor unit 804 through communications framework 802. The processes of the different embodiments may be performed by processor unit 804 using computer-implemented instructions, which may be located in a memory, such as memory 814.

These instructions are referred to as program code, computer usable program code, or computer readable program code that may be read and executed by a processor in processor unit 804. The program code in the different embodiments may be embodied on different physical or computer readable storage media, such as memory 814 or persistent storage 816.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818. Alternatively, program code 818 may be transferred to data processing system 800 using computer readable signal media 826. Computer readable signal media 826 may be, for example, a propagated data signal containing program code 818.

For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to, or in place of, those illustrated for data processing system 800. Other components shown in FIG. 8 can be varied from the illustrative examples shown. The different embodiments may be implemented using any hardware device or system capable of running program code 818.

The illustration of agriculture environment 200 and the different components in agriculture environment 200 in FIGS. 2-8 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, in one illustrative example, movement system 402 may be considered a separate component from rack system 214, instead of being a part of rack system 214 as depicted in FIG. 4. In another illustrative example, robotic arm system 410 may move unmanned aerial vehicle 230 between slot 232 in the group of racks 400 and takeoff and landing system 212.

As another illustrative example, other conditions may be identified using sensor data 208 in addition to, or in place of, undesired condition 246. For example, a desired condition, such as crops ready for harvesting, may be identified using sensor data 208.

With reference to FIGS. 9-13, illustrations of an unmanned aerial vehicle system are shown. These illustrations are an example of one physical implementation of unmanned aerial vehicle system 206 shown in block form in FIG. 2.

Figure 9:
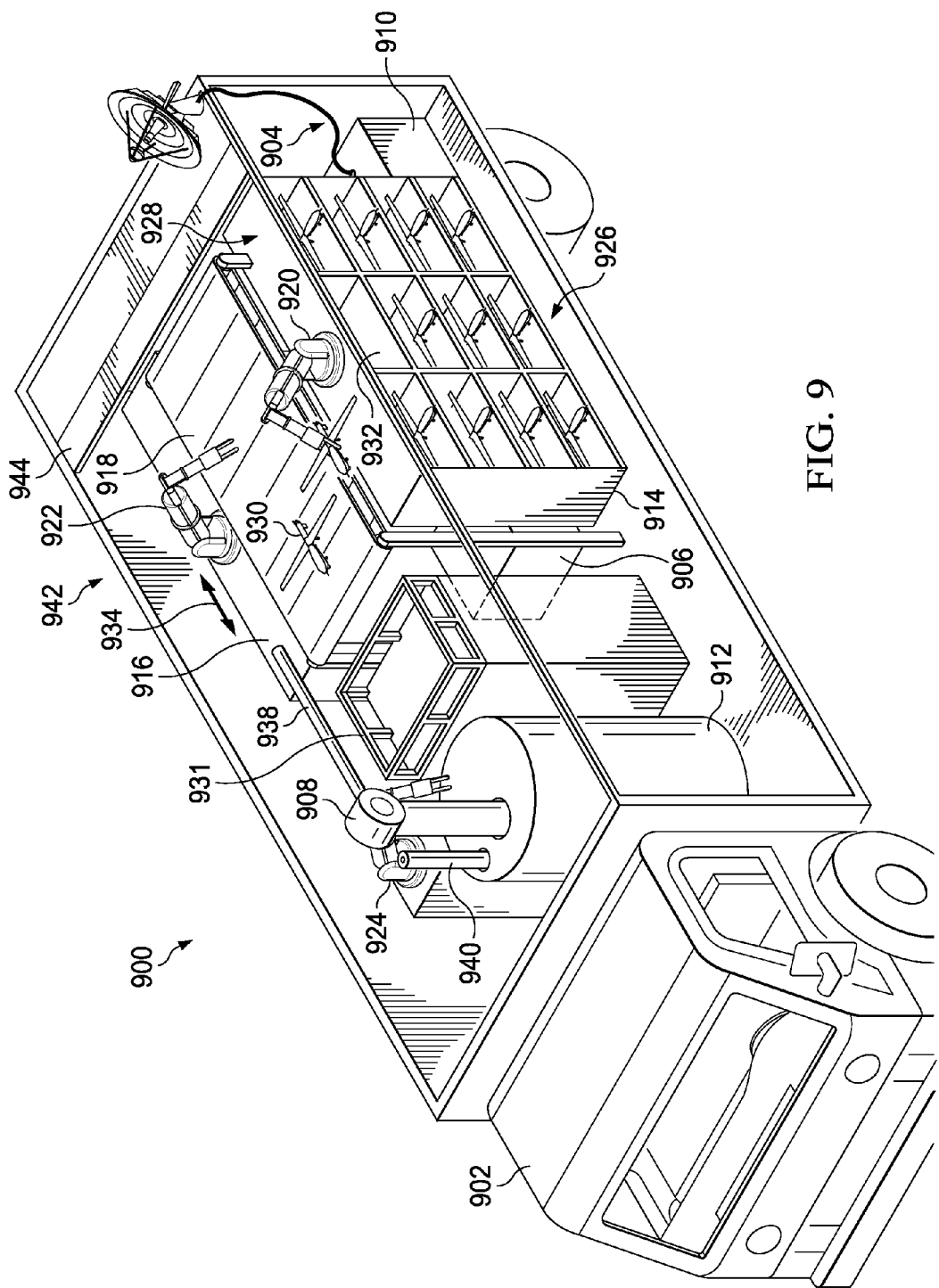
FIG. 9 is an illustration of an unmanned aerial vehicle system in accordance with an illustrative embodiment.

Turning first to FIG. 9, an illustration of an unmanned aerial vehicle system is depicted in accordance with an illustrative embodiment. As depicted, unmanned aerial vehicle system 900 is an example of an implementation of unmanned aerial vehicle system 206 shown in block form in FIG. 2. As depicted, unmanned aerial vehicle system 900 includes semi-trailer truck 902 as an example of an implementation for base vehicle 210 in FIG. 2. Other components for unmanned aerial vehicle system 900 are located inside semi-trailer truck 902. These other components are also examples of physical implementations for corresponding components shown in block form in FIG. 2.

In this exposed view of semi-trailer truck 902, different components are seen within semi-trailer truck 902. As depicted, rack system 904, refueling system 906, takeoff and landing system 908, communications system 910, and controller 912 are shown as associated with semi-trailer truck 902.

In this view, rack system 904 has rack 914, rack 916, conveyor 918, robotic arm 920, robotic arm 922, and robotic arm 924. Slots 926 in rack 914 and rack 916 hold unmanned aerial vehicles 928.

As depicted, robotic arm 920 is configured to move unmanned aerial vehicle 930 from slot 932 in slots 926 in rack 914 to conveyor 918. Conveyor 918 is configured to move unmanned aerial vehicle 930 between rack system 904 and takeoff and landing system 908. This movement is in the directions indicated by arrow 934.

As depicted takeoff and landing system 908 includes platform 931, launcher, and catcher 940. Conveyor 918 is configured to move unmanned aerial vehicle 930 to platform 931, launcher 938, catcher 940, or some combination thereof.

In this depicted example, refueling system 906 stores a liquid fuel used by unmanned aerial vehicles 928. Refueling system 906 is configured to transfer the liquid fuel to unmanned aerial vehicles 928 located in slots 926.

Communications system 910 provides an ability to communicate with a computer system in a remote location. Communications system 910 uses satellite communications in this example.

In the illustrative example, controller 912 controls the operation of rack system 904, refueling system 906, takeoff and landing system 908, communications system 910, and unmanned aerial vehicles 928 such that autonomous surveying of an agricultural region may occur in a manner that generates sensor data to identify conditions in the agricultural area. The operation of unmanned aerial vehicle system 900 may occur without needing intervention by a human operator.

In this depicted example, opening 942 is present in the top of semi-trailer truck 902. Opening 942 exposed when door system 944 moves in semi-trailer truck 902. Opening 942 provides space for unmanned aerial vehicles 928 to be launched and recovered.

Figure 10:
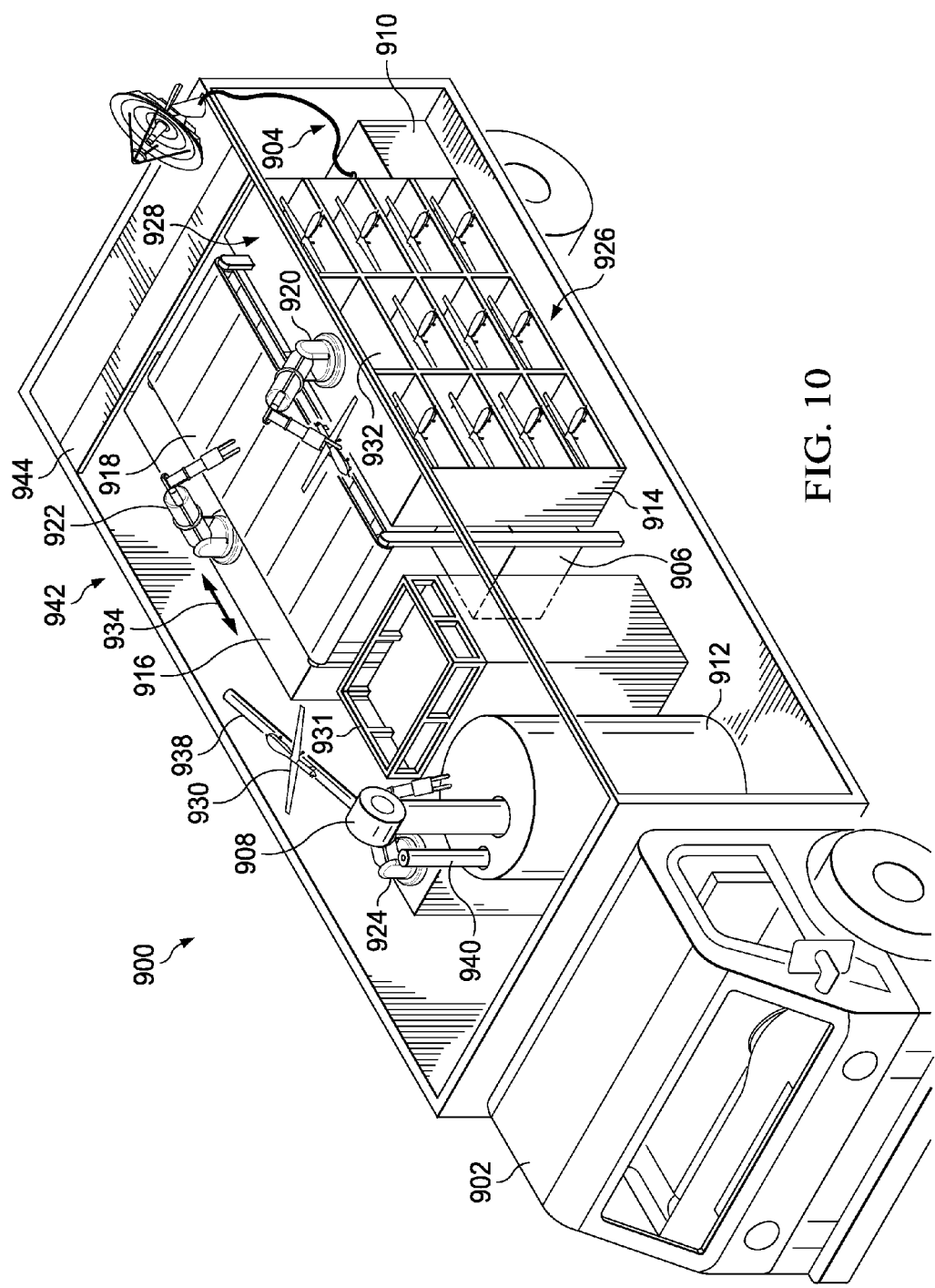
FIG. 10 is an illustration of an unmanned aerial vehicle system with an unmanned aerial vehicle positioned on a launcher in accordance with an illustrative embodiment.

Turning now to FIG. 10, an illustration of an unmanned aerial vehicle system with an unmanned aerial vehicle positioned on a launcher is depicted in accordance with an illustrative embodiment. As depicted, robotic arm 924 is configured to move unmanned aerial vehicle 930 from conveyor 918 to launcher 938. In this example, launcher 938 is a pneumatic catapult. As depicted, takeoff and landing system 908 takes the form of a launching and recovery system.

In this figure, unmanned aerial vehicle 930 is shown on launch 938 as positioned by robotic arm 924. Unmanned aerial vehicle 930 may be launched into the air and fly over an agricultural region and generate sensor data about the agricultural region.

Figure 11:
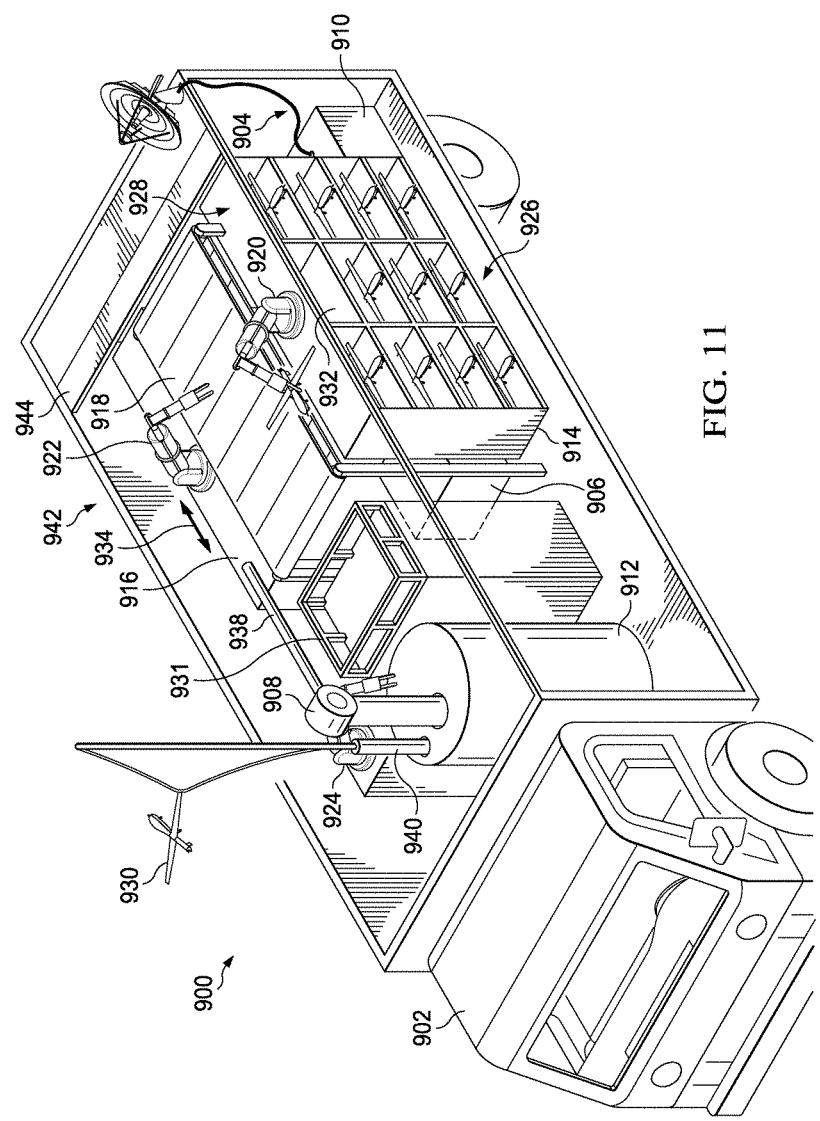
FIG. 11 is an illustration of an unmanned aerial vehicle system held by a catcher in accordance with an illustrative embodiment.

With reference to FIG. 11, an illustration of an unmanned aerial vehicle system held by a catcher is depicted in accordance with an illustrative embodiment. After performing a mission to generate sensor data, unmanned aerial vehicle is recovered using catcher 940 in this example.

In this figure, unmanned aerial vehicle 930 is shown as caught by catcher 940. Unmanned aerial vehicle 930 may be moved from catcher 940 to conveyor 918 by robotic arm 924. In turn, conveyor 918 moves unmanned aerial vehicle 930 to rack 914 where robotic arm 920 places unmanned aerial vehicle 930 back into slot 932.

Figure 12:
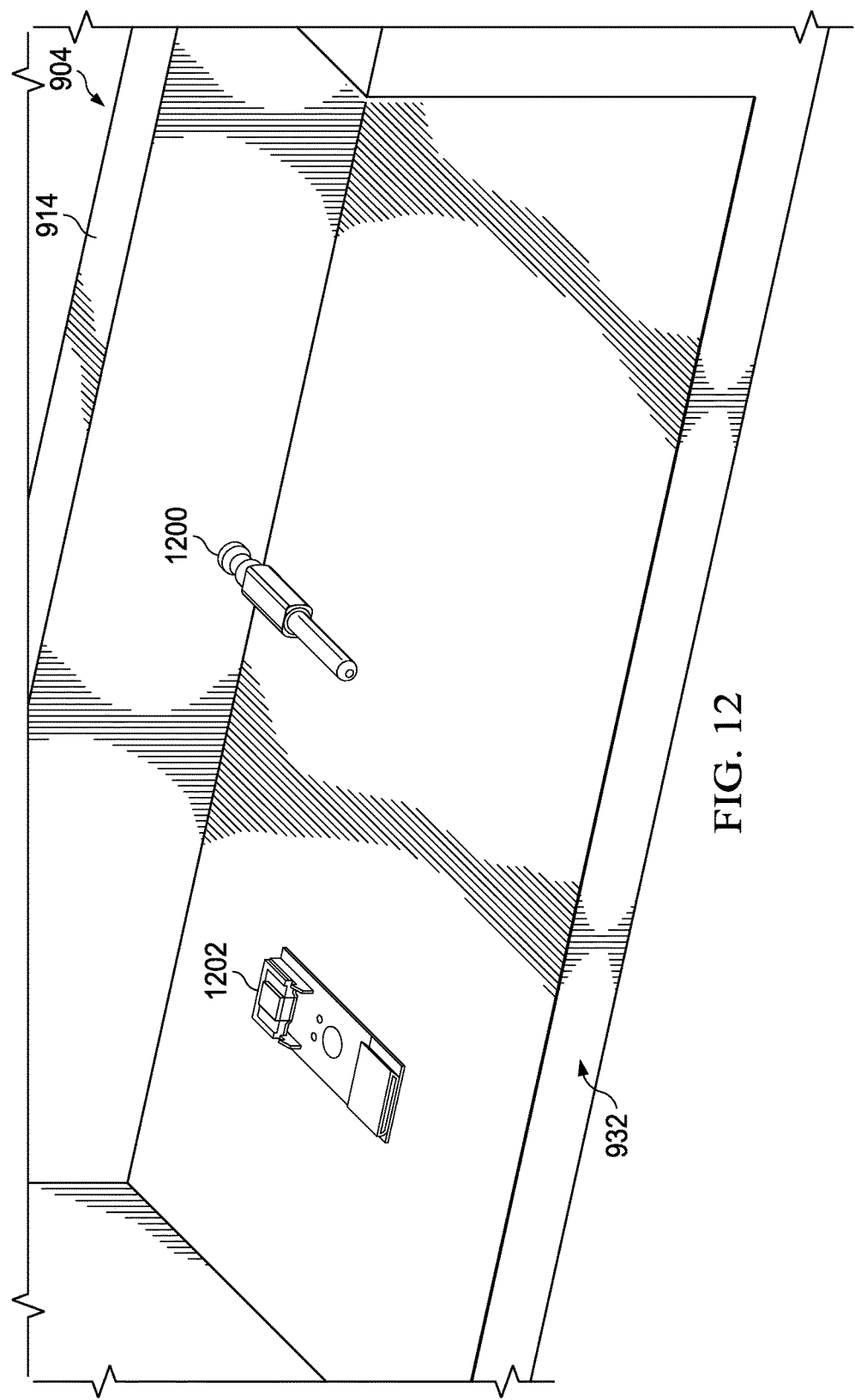
FIG. 12 is an illustration of a slot in a rack system in accordance with an illustrative embodiment.

Turning next to FIG. 12, an illustration of a slot in a rack system is depicted in accordance with an illustrative example. In this figure, a view of slot 932 is depicted. Slot 932 is a volume within rack 914. In this example, slot 932 has nozzle 1200 and contact 1202.

Nozzle 1200 is an example of a refueling port in refueling ports 612 in FIG. 6. Nozzle 1200 may be inserted into a refueling connection in unmanned aerial vehicle 930 to transfer a liquid fuel to unmanned aerial vehicle 930.

Figure 13:
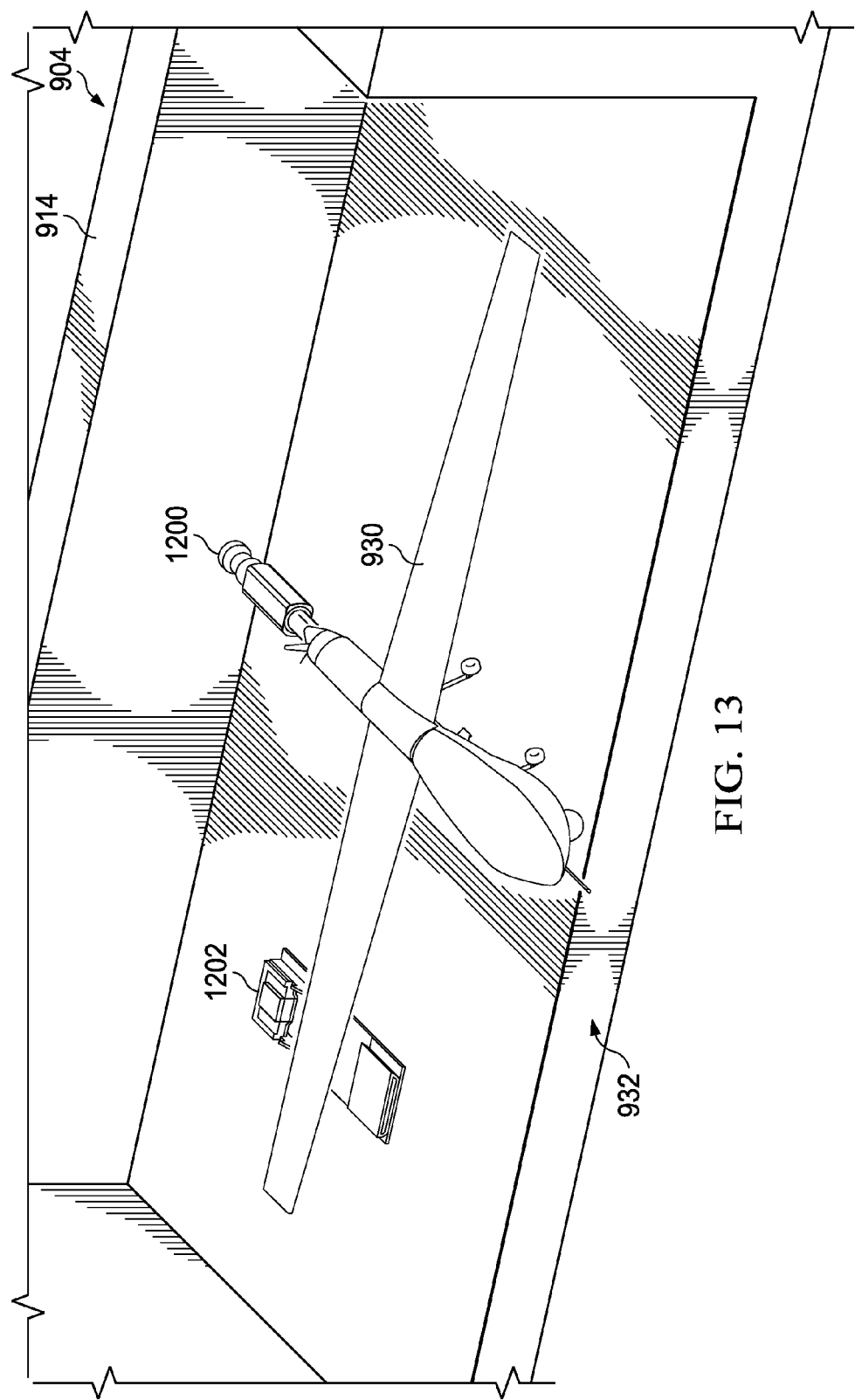
FIG. 13 is an illustration of an unmanned aerial vehicle in a slot in a rack system in accordance with an illustrative embodiment.

With reference now to FIG. 13, an illustration of an unmanned aerial vehicle in a slot in a rack system is depicted in accordance with an illustrative example. In this illustration, unmanned aerial vehicle 930 is shown as located in slot 932 in FIG. 9.

When in slot 932, unmanned aerial vehicle 930 may refuel and download sensor data simultaneously. Further, instructions, program code, settings, or other information may be uploaded to unmanned aerial vehicle 930 while located in slot 932.

The illustrations of unmanned aerial vehicle system 900 and the different components in FIGS. 9-12 are shown as an example of one implementation for an unmanned aerial vehicle system. The illustrations are not meant as limitations to the manner in which unmanned aerial vehicle system 206 shown in block form in FIG. 2 may be implemented. For example, contact 1202 may be used in place of nozzle 1200 in FIG. 12 to refuel unmanned aerial vehicle 930 electrically. In another example, a wireless connection may be used in place of contact 1202 to download sensor data. In yet another illustrative example, an inductive charging system may be used to refuel unmanned aerial vehicle 930.

Further, unmanned aerial vehicle 930 is shown as an airplane. In other implementations, unmanned aerial vehicle 930 may be a helicopter or quadcopter. In yet another illustrative example, a train or an automobile may be used in place of semi-trailer truck 902.

Figure 14:
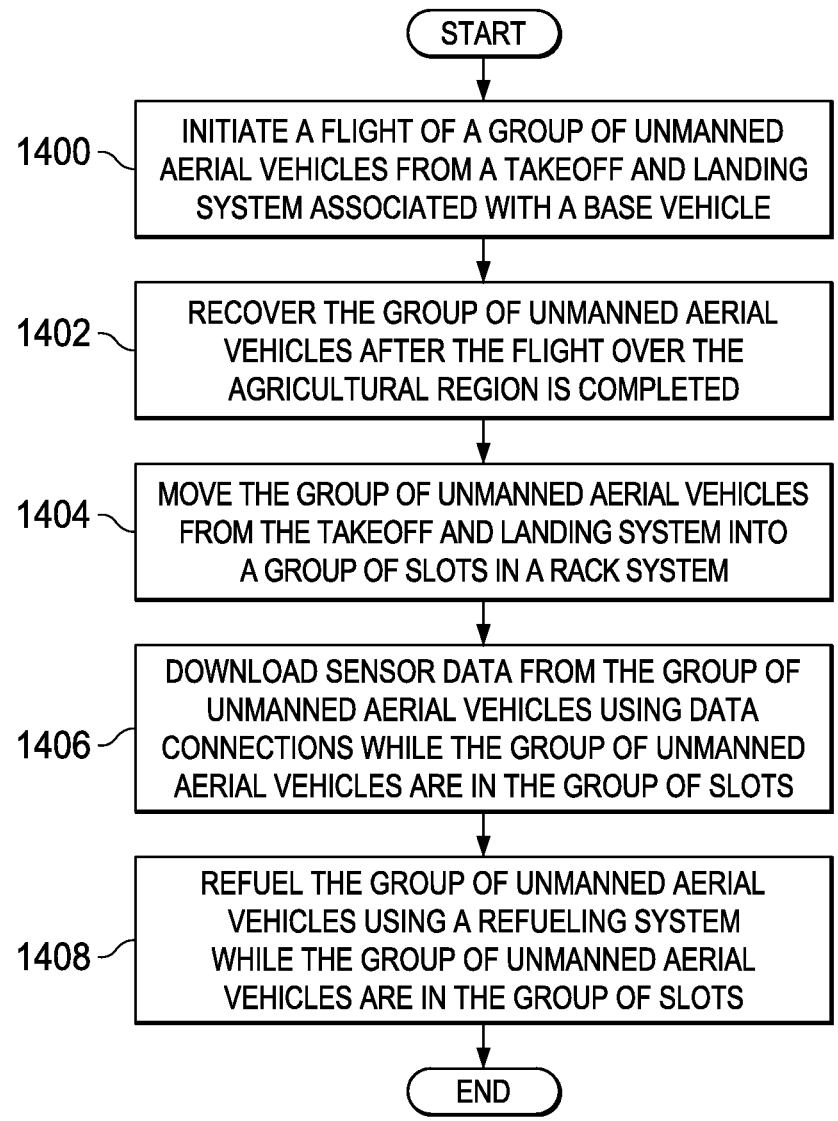
FIG. 14 is an illustration of a flowchart of a process for surveying a land region in accordance with an illustrative embodiment.

Turning next to FIG. 14, an illustration of a flowchart of a process for serving a land region is depicted in accordance with an illustrative embodiment. The process illustrated in this figure may be implemented in agricultural environment 200 in FIG. 2. In particular, one or more of the different operations may be implemented in unmanned aerial vehicle system 206.

The process begins by initiating a flight of a group of unmanned aerial vehicles from a takeoff and landing system associated with a base vehicle (operation 1400). The group of unmanned aerial vehicles flies over the agricultural region and generates sensor data about the region of land. The process recovers the group of unmanned aerial vehicles after the flight over the agricultural region is completed (operation 1402). The recovery may be assisted or unassisted in operation 1402. For example, an unmanned aerial vehicle may be recovered in an unassisted manner when the unmanned aerial vehicle lands on a platform in unmanned aerial vehicle system 206. In another example, the unmanned aerial vehicle may be recovered in an assisted manner using a catcher in unmanned aerial vehicle system 206.

The process moves the group of unmanned aerial vehicles from the takeoff and landing system into a group of slots in a rack system (operation 1404). Thereafter, the process downloads sensor data from the group of unmanned aerial vehicles using data connections while the group of unmanned aerial vehicles are in the group of slots (operation 1406), and refuels the group of unmanned aerial vehicles using a refueling system while the group of unmanned aerial vehicles are in the group of slots (operation 1408). The process terminates thereafter.

In this manner, simultaneous downloading of sensor refueling of the group of unmanned aerial vehicles is enabled. Operation 1406 and operation of 1408 may be performed substantially the same time even though the operations are shown as sequential in the flowchart. In this manner, simultaneous downloading of sensor data refueling of the group of unmanned aerial vehicles is enabled.

Figure 15:
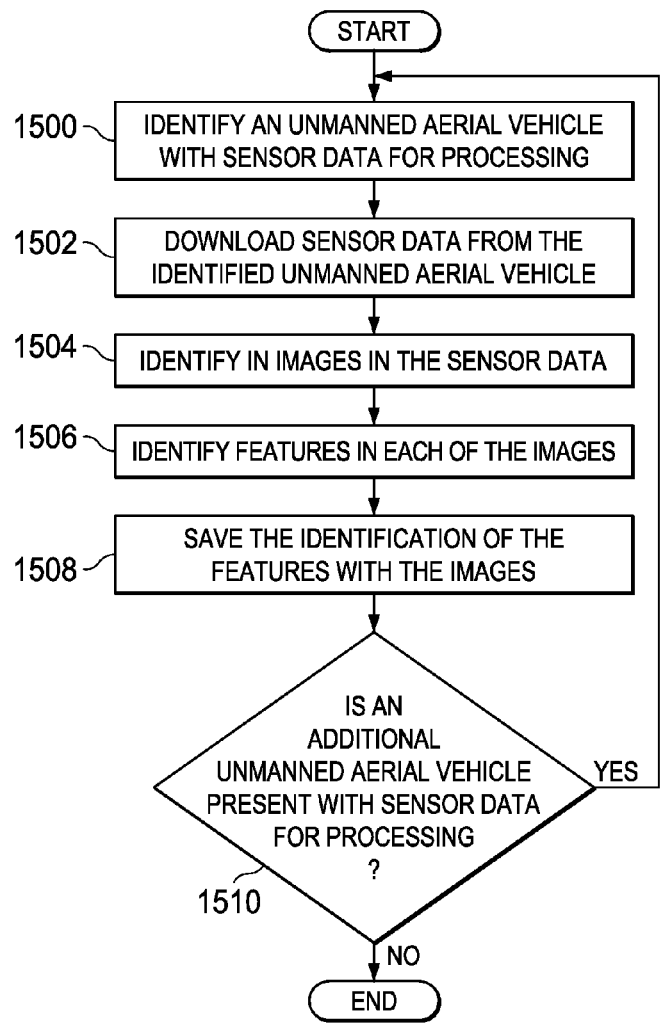
FIG. 15 is an illustration of a flowchart of a process for pressing sensor data in accordance with an illustrative embodiment.

Turning next to FIG. 15, an illustration of a flowchart of a process for processing sensor data is depicted in accordance with an illustrative embodiment. The process illustrated in this figure may be implemented in agricultural environment 200 in FIG. 2. In particular, one or more of the different operations may be implemented in controller 218 in unmanned aerial vehicle system 206 in FIG. 2.

The process begins by identifying an unmanned aerial vehicle with sensor data for processing (operation 1500). The process downloads sensor data from the identified unmanned aerial vehicle (operation 1502).

The process identifies images in the sensor data (operation 1504). The process identifies features in each of the images (operation 1506) and saves the identification of the features with the images (operation 1508).

In operation 1506, the features identified may take various forms. For example, the process may identify leaves, identify individual plants, identify spectral bands that may be used to calculate stress, and other suitable features that may be used to analyze the agricultural region.

A determination is made as to whether an additional unmanned aerial vehicle is present with sensor data for processing (operation 1510). If an additional unmanned aerial vehicles present, the process returns to operation 1500. Otherwise, the process terminates. In this manner, sensor data may be pre-processed in the unmanned aerial vehicle system prior to sending the sensor data to a remote location for further processing or analysis. In this manner, controller 218 in FIG. 2 is configured to process sensor data received from the unmanned aerial vehicles to form images with identifications of features in an agricultural region.

Figure 16:
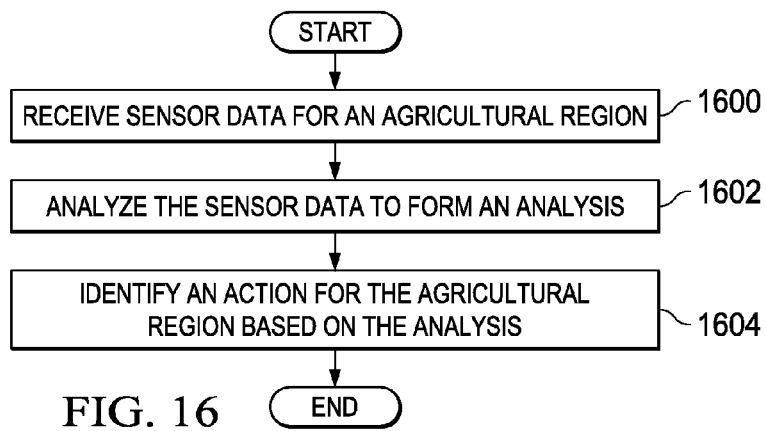
FIG. 16 is an illustration of a flowchart of a process for analyzing sensor data in accordance with an illustrative embodiment.

With reference next to FIG. 16, an illustration of a flowchart of a process for analyzing sensor data is depicted in accordance with an embodiment. The process illustrated in FIG. 16 may be implemented in agricultural environment 200 in FIG. 2. This process may be implemented in controller 218 in at least one of unmanned aerial vehicle system 206 or remote computer system 242 in FIG. 2.

The process receives sensor data for an agricultural region (operation 1600). The process analyzes the sensor data to form an analysis (operation 1602). The analysis in operation 1602 may take various forms. For example, the analysis may be performed to identify at least one of irrigation needs, the presence of insect infestations, a level of growth of crops, a maturity of livestock, a presence of weeds, or other conditions that may be in the agricultural region.

The process then identifies an action for the agricultural region based on the analysis (operation 1604). The process terminates thereafter.

In operation 1604, the identification of an action may include generating a prescription. The prescription may include steps and items needed for actions such as optimum fertilization, disease control, pest control, and other actions for the agricultural region. For example, fertilizers, pesticides, herbicides, chemicals, and water are examples of items that may be used. Further, the prescription also may identify locations where items should be applied. The action may be application of an item, adjustments of an irrigation system, or some other suitable action.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative examples provided method and apparatus for managing an agricultural region. For example, the management of the agricultural region may include surveying the agricultural region using an unmanned aerial vehicle system to identify conditions in the agricultural region.

One or more illustrative examples provide one or more technical solutions that overcome a technical problem with obtaining information about an agricultural region as efficiently as desired. One technical effect of the one or more technical solutions is an ability to identify actions that may be needed in the agricultural region in a timely manner. For example, time may be of the essence with respect to certain insect infestations and diseases.

With the use of the unmanned aerial vehicle system in the illustrative examples, an autonomous generation of sensor data occurs in a manner that allows for sensor data to be generated more frequently and more quickly than with existing sensor data collection systems using aerial vehicles. Further, another technical effect from one or more the technical solutions is a reduction in the cost for a sensor system to monitor and agricultural region.

With the unmanned aerial vehicle system in the illustrative examples, the use of sensor networks installed on the land in the agricultural region may be reduced or eliminated. Further, maintenance needed with these types of systems also may be reduced or eliminated. This technical effect may be especially useful when the agricultural regions are larger in area.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An apparatus comprising:
a base vehicle;
a takeoff and landing system associated with the base vehicle including a catcher, a conveyor and a robotic arm system, wherein the catcher is configured to recover an unmanned aerial vehicle while the unmanned aerial vehicle is in the air;
a rack system associated with the base vehicle, wherein the rack system comprises a group of racks with slots in which the slots are configured to receive unmanned aerial vehicles, provide refueling connections that facilitate refueling of the unmanned aerial vehicles located in the slots, and provide data connections that facilitate data transmission with the unmanned aerial vehicles located in the slots;
a refueling system associated with the base vehicle, wherein the refueling system is configured to refuel an unmanned aerial vehicle in the unmanned aerial vehicles located in a slot using a refueling connection in the refueling connections; and
a controller associated with the base vehicle, wherein the controller is configured to communicate with the unmanned aerial vehicle using a data connection in the data connections and control the refueling of the unmanned aerial vehicles by the refueling system while the unmanned aerial vehicle is in the slot, enabling exchanging data with the unmanned aerial vehicle and the refueling of the unmanned aerial vehicle simultaneously;
wherein the unmanned aerial vehicle is a fixed wing aircraft;
wherein, responsive to the catcher recovering the unmanned aerial vehicle while the unmanned aerial vehicle is in the air, the robotic arm system places the unmanned aerial vehicle onto the conveyor for transport to the rack system, and upon arrival of the unmanned aerial vehicle at the group of racks, the robotic arm system places the unmanned aerial vehicle into the slot.

2. The apparatus of claim 1, wherein the controller comprises:
a vehicle manager configured to communicate with the unmanned aerial vehicles using the data connections and control the refueling of the unmanned aerial vehicles while the unmanned aerial vehicles are located in the slots; and
a sensor data manager in communication with the vehicle manager, wherein the sensor data manager is configured to receive and store sensor data from the unmanned aerial vehicles using the data connections.

3. The apparatus of claim 1, wherein the controller is configured to control a flight of a group of the unmanned aerial vehicles over an agricultural region such that the group of the unmanned aerial vehicles generates sensor data about the agricultural region, download the sensor data from the group of the unmanned aerial vehicles over a group of the data connections for a group of slots in which the group of the unmanned aerial vehicles are placed after the flight of the group of the unmanned aerial vehicles.

4. The apparatus of claim 2, wherein the controller is configured to identify an undesired condition in an agricultural region using the sensor data, and identify an action based on the undesired condition in the agricultural region when the undesired condition in the agricultural region is present.

5. The apparatus of claim 4, wherein the action is selected from a group comprising sending an alert, generating a report, analyzing the undesired condition, identifying a corrective action to reduce the undesired condition, generating a prescription to correct the undesired condition, and sending a command to control an irrigation system in the agricultural region.

6. The apparatus of claim 1, wherein the refueling system is selected from at least one of an inductive charging system, a conductive charging system, or a liquid refueling system.

7. The apparatus of claim 1, wherein the data connections are wireless data connections.

8. The apparatus of claim 1, wherein the takeoff and landing system comprises:
a movement system configured to move the unmanned aerial vehicle to the takeoff and landing system from the slot, and to the slot from the takeoff and landing system.

9. The apparatus of claim 1, wherein the takeoff and landing system further comprises a platform and a launcher.

10. The apparatus of claim 1, wherein the controller is configured to process sensor data received from the unmanned aerial vehicles to form images with identifications of features in an agricultural region.

11. The apparatus of claim 1, wherein the controller monitors health of the unmanned aerial vehicles and determines whether maintenance is needed for the unmanned aerial vehicles.

12. The apparatus of claim 1, wherein the rack system further comprises:
a conveyor system that moves the unmanned aerial vehicle on the conveyer system between the group of racks and the takeoff and landing system; and
the robotic arm system.

13. The apparatus of claim 1, wherein the base vehicle is selected from a group comprising:
a truck, a sport utility vehicle, a trailer, a train, and a semi-trailer truck.

14. The apparatus of claim 1, wherein the slots are configured to receive an airplane, a helicopter, an ornithopter, or a quadcopter.

15. An unmanned aerial vehicle system comprising:
a semi-trailer truck;
a launching and recovery system associated with the semi-trailer truck, wherein the launching and recovery system is configured to launch and recover unmanned aerial vehicles and includes a catcher, a conveyor and a robotic arm system, wherein the catcher is configured to recover the unmanned aerial vehicle while the unmanned aerial vehicle is in the air;
a rack system associated with the semi-trailer truck, wherein the rack system comprises slots in a group of racks configured to receive the unmanned aerial vehicles, provide refueling connections that facilitate refueling of the unmanned aerial vehicles located in the slots, and provide data connections that facilitate data transmission with the unmanned aerial vehicles located in the slots;
a refueling system associated with the semi-trailer truck, wherein the refueling system is configured to refuel the unmanned aerial vehicle in the unmanned aerial vehicles located in the slots using the refueling connections;
a controller associated with the semi-trailer truck, wherein the controller is configured to communicate with the unmanned aerial vehicles using the data connections and control the refueling of the unmanned aerial vehicles by the refueling system while the unmanned aerial vehicles are in the slots, control a flight of a group of the unmanned aerial vehicles over an agricultural region such that the group of the unmanned aerial vehicles generate sensor data about the agricultural region; download the sensor data from the group of the unmanned aerial vehicles over a group of the data connections for a group of the slots in which the group of the unmanned aerial vehicles are placed after the flight of the group of the unmanned aerial vehicles; and
a door system on the semi-trailer truck that are moveable to facilitate launching and recovery of the unmanned aerial vehicles;
wherein the unmanned aerial vehicle is a fixed wing aircraft; and
wherein, responsive to the catcher recovering the unmanned aerial vehicle while the unmanned aerial vehicle is in the air, the robotic arm system places the unmanned aerial vehicle onto the conveyor for transport to the rack system, and upon arrival of the unmanned aerial vehicle at the group of racks, the robotic arm system places the unmanned aerial vehicle into a slot.

16. A method for surveying an agricultural region, the method comprising:
initiating a flight of a group of unmanned aerial vehicles from a takeoff and landing system associated with a base vehicle, wherein the group of unmanned aerial vehicles flies over the agricultural region and generate sensor data about the agricultural region;
recovering the group of unmanned aerial vehicles after the flight over the agricultural region is completed using a catcher, a conveyor and a robotic arm system, wherein the catcher is configured to recover the unmanned aerial vehicle while the unmanned aerial vehicle is in the air, wherein the unmanned aerial vehicle is a fixed wing aircraft, and wherein, responsive to the catcher recovering the unmanned aerial vehicle while the unmanned aerial vehicle is in the air, the robotic arm system places the unmanned aerial vehicle onto the conveyor for transport to a rack system, and upon arrival of the unmanned aerial vehicle at a group of racks, the robotic arm system places the unmanned aerial vehicle into a slot;
moving the group of unmanned aerial vehicles from the takeoff and landing system into a group of slots in the rack system;
downloading sensor data from the group of unmanned aerial vehicles using data connections while the group of unmanned aerial vehicles is in the group of slots; and
refueling the group of unmanned aerial vehicles using a refueling system while the group of unmanned aerial vehicles is in the group of slots, wherein simultaneous downloading of sensor data and refueling of the group of unmanned aerial vehicles is enabled.

17. The method of claim 16 further comprising:
identifying an undesired condition in the agricultural region using the sensor data, and
identifying an action based on the undesired condition in the agricultural region when the undesired condition in the agricultural region is present.

18. The method of claim 17, wherein the action is selected from a group comprising sending an alert, generating a report, analyzing the undesired condition, identifying a corrective action to reduce the undesired condition, generating a prescription to correct the undesired condition, and sending a command to control an irrigation system in the agricultural region.

19. The method of claim 16, wherein the refueling system is selected from at least one of an inductive charging system, a conductive charging system, or a liquid refueling system.

20. The method of claim 16, wherein the data connections are wireless data connections.

21. The method of claim 16, wherein the takeoff and landing system is selected from at least one of a platform, a launcher, or a catcher.

22. The method of claim 16, wherein a movement system is configured to move the group of unmanned aerial vehicles between the takeoff and landing system from the group of slots and to the group of slots from the takeoff and landing system and wherein the movement system is selected from at least one of the robotic arm system or a conveyor system.

23. The method of claim 16, wherein the base vehicle is selected from a group comprising a truck, a sport utility vehicle, a trailer, a train, and a semi-trailer truck.

24. The method of claim 16, wherein the group of slots are configured to receive an airplane, a helicopter, an ornithopter, or a quadcopter.

* * * * *

UNITED STATES PATENT AND TRADEMARK OFFICE
CERTIFICATE OF CORRECTION

| | |
|---|---|
| PATENT NO. | : 9,776,717 B2 |
| APPLICATION NO. | : 14/873399 |
| DATED | : October 3, 2017 |
| INVENTOR(S) | : Charles B. Spinelli and John Lyle Vian |

It is certified that error appears in the above-identified patent and that said Letters Patent is hereby corrected as shown below:

On the Title Page

Abstract, Line 13, change "control" to --controls--

In the Claims

Column 18, Line 45, Claim 3 after "region," insert --and to--
Column 19, Line 55, Claim 15 after "to" insert --:--
Column 19, Line 57, Claim 15 after "and" insert --to--
Column 19, Line 59, Claim 15 change "slots" to --slots;--
Column 20, Line 1, Claim 15 change "are" to --is--
Column 20, Line 20, Claim 16 change "generate" to --generates--
Column 21, Line 10, Claim 24 change "are" to --is--

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*